(12) United States Patent
Lester (10) Patent No.: US 10,406,987 B1
(45) Date of Patent: Sep. 10, 2019

(54) VEHICLE RACK DELIVERY SYSTEM

(71) Applicant: TYMORG Leasing, LLC, Reno, NV (US)

(72) Inventor: Timothy Lester, Reno, NV (US)

(73) Assignee: Timothy Alan Lester, Reno, NV (US)

( * ) Notice: Subject to any disclaimer, the term of this patent is extended or adjusted under 35 U.S.C. 154(b) by 0 days.

(21) Appl. No.: 15/927,775

(22) Filed: Mar. 21, 2018

(51) Int. Cl.
  *B60R 9/045* (2006.01)
  *B60R 9/058* (2006.01)

(52) U.S. Cl.
  CPC ............. *B60R 9/045* (2013.01); *B60R 9/058* (2013.01)

(58) Field of Classification Search
  CPC .... B60R 9/00; B60R 9/02; B60R 9/04; B60R 9/042; B60R 9/0423; B60R 9/045; B60R 9/048; B60R 9/0485; B60R 9/12; B60R 2011/0084; E06C 5/04; E06C 5/06; E06C 5/16; E06C 5/14
  See application file for complete search history.

(56) References Cited

U.S. PATENT DOCUMENTS

| | | | | |
|---|---|---|---|---|
| 3,963,136 A * | 6/1976 | Spanke | ................ | B60R 9/0423 414/462 |
| 4,339,223 A * | 7/1982 | Golze | ..................... | B60R 9/055 180/271 |
| 4,350,471 A * | 9/1982 | Lehmann | ............... | B62D 43/02 224/310 |
| 4,439,086 A * | 3/1984 | Thede | ....................... | B60R 9/08 224/310 |
| 4,446,998 A * | 5/1984 | Taig | ........................ | B60R 9/042 224/310 |
| 5,104,280 A * | 4/1992 | Ziaylek | ................. | B60R 9/0423 280/4 |
| 5,154,563 A * | 10/1992 | Phillips | ................. | B60R 9/0426 224/326 |
| 5,417,358 A * | 5/1995 | Haselgrove | ............. | B60R 9/042 224/310 |
| 5,423,650 A * | 6/1995 | Zerbst | ..................... | B60R 9/042 224/310 |
| 5,544,796 A * | 8/1996 | Dubach | .................... | B60R 9/042 224/310 |
| 5,884,824 A * | 3/1999 | Spring, Jr. | ............. | B60R 9/042 224/309 |
| 6,015,074 A * | 1/2000 | Snavely | .................. | B60R 9/042 224/310 |
| 6,158,638 A * | 12/2000 | Szigeti | .................... | B60R 9/042 224/310 |
| 6,308,874 B1 * | 10/2001 | Kim | ....................... | B60R 9/042 224/309 |

(Continued)

*Primary Examiner* — Brian D Nash (57) ABSTRACT

The present invention provides, in at least one embodiment, a vehicle roof rack for a sports utility vehicle or another tall vehicle. The rack attaches to the vehicle's roof by way of a base. The rack uses one or more carriers attached to the rack's base, along with removably attachable racks, to hold one or more rooftop objects such as sporting goods, boxes, surfboards, etc., on the roof of the vehicle during operation of the vehicle. The base controllably and safely delivers, and returns, the carriers and objects from the roof to a user working height, such as the chest level of the driver, to the driver or passenger sides of the car and nearby the sides of the car, such that the user can load and unload safely without climbing on the vehicle or going into traffic.

19 Claims, 11 Drawing Sheets

(56) References Cited

U.S. PATENT DOCUMENTS

| | | | |
|---|---|---|---|
| 6,428,263 B1* | 8/2002 | Schellens | B60R 9/042 224/310 |
| 6,561,396 B2* | 5/2003 | Ketterhagen | B60R 9/042 224/310 |
| 6,681,970 B2* | 1/2004 | Byrnes | B60R 9/042 224/310 |
| 6,712,247 B1* | 3/2004 | Fox | B60R 9/042 224/310 |
| 6,854,627 B2* | 2/2005 | Foo | B60R 9/048 182/127 |
| 7,048,490 B2* | 5/2006 | Henderson | B60R 9/042 224/310 |
| 8,382,418 B2* | 2/2013 | DiVerdi | B60R 9/0423 187/236 |
| 8,640,933 B1* | 2/2014 | McCray | B60R 9/042 224/310 |
| 9,193,305 B2* | 11/2015 | Kramer | B60R 9/042 |
| 9,327,654 B2* | 5/2016 | Richter | E06C 5/04 |
| 9,457,727 B2* | 10/2016 | Hobbs | B60R 9/06 |
| 9,463,748 B2* | 10/2016 | Presley | B60R 9/042 |
| 9,987,995 B2* | 6/2018 | Paunov | B60R 9/0423 |
| 2004/0026472 A1* | 2/2004 | Foo | B60R 9/042 224/310 |
| 2004/0028510 A1* | 2/2004 | Jones | B60R 9/042 414/462 |
| 2006/0185933 A1* | 8/2006 | Thibault | B60R 9/0423 182/127 |
| 2006/0285954 A1* | 12/2006 | Neary | B60P 3/1025 414/465 |
| 2009/0140021 A1* | 6/2009 | Richter | E06C 5/04 224/310 |
| 2009/0145940 A1* | 6/2009 | Bukowiec | B60R 9/042 224/310 |
| 2011/0038698 A1* | 2/2011 | Li | B60P 3/14 414/479 |
| 2013/0248567 A1* | 9/2013 | Townsend | B60R 9/042 224/321 |
| 2013/0334267 A1* | 12/2013 | Sautter, Jr. | B60R 9/0423 224/324 |
| 2014/0217140 A1* | 8/2014 | Kramer | B60R 9/042 224/484 |
| 2018/0162288 A1* | 6/2018 | Sautter | B60P 1/00 |

* cited by examiner

VEHICLE RACK DELIVERY SYSTEM

BACKGROUND OF THE INVENTION

1. Field of Invention

The invention relates generally to the vehicle roof racks affecting retail, commercial, military and other industries, and more specifically to an improved vehicle rack delivery system.

2. Description of Related Art

A roof rack attaches to the roof of a vehicle and transports objects that are inconvenient or impossible to store in the vehicle's interior space. A conventional roof rack includes towers, and mounts which attach to the towers, to secure a particular object on the car's roof. The towers attach to a car's factory installed pair of side rails or tracks. Some roof racks also include a pair of cross beams that attach to the car's side rails.

SUMMARY OF THE INVENTION

While embodiments of the invention are designed for retail sporting goods such as skis, snowboards, surfboards, bicycles, and similar bulky items, the invention also has uses for commercial and military applications that face the same challenges (safely lowering and raising loads from vehicle roof racks to a working height).

The present invention provides, in at least one embodiment, a vehicle roof rack for a sports utility vehicle or any tall vehicle. The vehicle, with an elevated load carrying area, including a sports utility vehicle or any other vehicle tall enough to make a user climb off of the ground to load it. The rack attaches to the vehicle's roof by way of a base. The rack uses one or more operable carriers attached to the rack's fixed base, along with detachable carriers, to deliver and secure one or more objects to the roof of the vehicle during operation of the vehicle. The base controllably and safely delivers, and returns, the carriers and their loads from the roof to a user working height defined as a height where a user can load and unload the rack safely without climbing on the vehicle or stepping back into traffic.

In one embodiment, an apparatus comprises: a base attached to a roof of a vehicle; one or more carriers attached to the base; one or more detachable racks attached to the carriers, the racks securing one or more rooftop objects on the roof during operation of the vehicle; and one or more extender beams on the base, wherein the extender beams controllably move the carriers and the objects mechanically, electrically, or hydraulically along the base, wherein the base controllably delivers the carriers and the objects from the roof to at least one of a passenger side or a driver side of the vehicle, and the base comprises a flat portion and a curved portion, the curved portion delivers the carriers and the objects within a predetermined distance of the driver side or the passenger side of the vehicle.

In another embodiment, a method comprises the steps of: attaching a base to a roof of a vehicle; attaching one or more carriers to the base; removably attaching one or more racks to the carriers, the racks securing one or more rooftop objects on the roof during operation of the vehicle; and attaching one or more extender beams on the base, wherein the extender beams controllably move the carriers and the objects mechanically, electrically, or hydraulically along the base, wherein the base controllably delivers the carriers and the objects from the roof to at least one of a passenger side or a driver side of the vehicle, and the base comprises a flat portion and a curved portion, the curved portion delivers the carriers and the objects within a predetermined distance of the driver side or the passenger side of the vehicle.

In a further embodiment, a system comprises: a vehicle; a base attached to a roof of the vehicle; one or more rooftop objects; one or more carriers attached to the base; one or more racks removably attached to the carriers, the racks securing one or more rooftop objects on the roof during operation of the vehicle; and one or more extender beams on the base, wherein the extender beams controllably move the carriers and the objects mechanically, electrically, or hydraulically along the base, wherein the base controllably delivers the carriers and the objects from the roof to at least one of a passenger side or a driver side of the vehicle, and the base comprises a flat portion and a curved portion, the curved portion delivers the carriers and the objects within a predetermined distance of the driver side or the passenger side of the vehicle.

An advantage of the present invention is the ease of loading and unloading. Easy loading and unloading is provided by the base delivering the carrier to a user working height, such as the user's chest. Additionally, easy unloading is also provided by a handle that is lower than the carrier on the roof of the vehicle and thus easier to reach if the user cannot reach the roof to initiate the delivery of the carrier.

Another advantage of the present invention is user safety by keeping the load close to the vehicle's side, thus keeping a user out of the road away from traffic; and also from preventing injury by keeping the user from climbing on the vehicle to load objects to elevated vehicle rooftops. User safety from traffic is provided by the base of the rack delivering a rooftop object within a predetermined distance nearby the car, preventing a driver from having to go into traffic while parked and unloading adjacent to a street full of cars. User safety from traffic is also provided by the base having a pair of carriers that delivers the carriers in opposite directions, one direction being towards the passenger side, which faces the side walk and not the traffic. Further, the base delivering the carrier to a user working height prevents the conventional activity of climbing on the car, which is dangerous.

A further advantage of the present invention is the controlled manner of delivery provided by the base with a mechanically controlled extender beam/bar and the carrier that prevents or significantly reduces the risk an object falling and hitting the user, the car, or another nearby parked or driving car. The extender bar provides controlled delivery and disposition because it moves the carriers and objects in a slow and controlled manner down and up the sides of the car, such that the objects cannot accelerate downward to injure the user or cause other damage. Also, the carrier is constrained laterally and vertically to prevent extension past the working height such that the carriers and secured loads cannot fall or come crashing down to the ground.

While conventional roof racks may lower a load to the side of a car using a mechanic device such as a pin or lever, these racks/extensions do not address the inherent safety problems of tall vehicle access and lack the safety, control, and ease of the present invention. In particular they have no features that prevent users from climbing on tall vehicles to access the load; their horizontal base position forces both the load and user away from the vehicle into traffic; there is no mechanism to control load acceleration; and their horizontal base and pivot mechanism actually forces the user and load into traffic and away from the vehicle. The mechanisms also have no means to de-accelerate the load to prevent injury to the user or damage to the vehicle as the load is lowered and the force of gravity naturally accelerates the load.

Conventional roof racks do not control the load, do not keep the user close to the vehicle to keep them out of traffic, do not prevent injury by preventing load acceleration, do not prevent injury by keeping the user from climbing on the vehicle, and do not keep the user from unsafe (extended) positions while loading and unloading the carrier. They lack the safety, control, and ease of the present invention due to their horizontal support portions pushing the user and object way out away from the car (e.g., into traffic or other parked cars) and lack of controllably unloading nearby the side of the car.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Further features and advantages of the invention, as well as the structure and operation of various embodiments of the invention, are described in detail below with reference to the accompanying FIGS. 1-20, wherein like reference numerals refer to like elements. Although a particular rack is illustrated (e.g., a ski rack) to attach to the carriers, one with skill in the art could attach a rack designed for another object other than a ski (e.g., a pod, a bike rack, a board rack, a surfboard rack, etc.). Also, although the rack is illustrated with a split design that can delivery loads to each side of the vehicle, other embodiments can solely operate on one or the other side of a vehicle.

In embodiments of the present invention, the fundamental idea of the Rack, e.g., CaddyRack or apparatus, is a mechanical system that delivers various goods such as sporting goods, boxes, bulky items, military gear, medical gear, boxes; anything that one would load on an elevated vehicle, typically a sports utility vehicle (SUV), but any tall vehicle roof/roof rack from the top of that vehicle to a "working height," with the working height being defined as a height where goods can be removed and/or loaded from the torso area of someone in a natural standing position. The rack is intended to deliver the rooftop items in a safe and controlled assisted manner to keep to operator from climbing on the vehicle at a ski resort or a surfer parked on the side of the road near the beach stepping back or have the surfboard swing back into traffic, or having to balance loads during their transition from the vehicle's roof to the working height. The rack is intended to deliver the rooftop items right in close to the side of the vehicle to prevent the operator from stepping back into traffic or other obstacles, and to allow the system to be utilized in narrow spaces such as a garage.

The system would be in the form of an articulating rack that mechanically moves the load via a sliding carriage that moves down a curved rail to allow the rack to extend downward to reach the working height/distance (i.e., the loading/unloading area). The rack is a split design that can deliver loads to each side of the vehicle; or which can solely operate on one or the other side of a vehicle. Different load attachments will be designed for specific uses as necessary; for sporting goods, for instance, different loading/unloading systems (these attached to the Rack's base) will be designed for skis, surfboards, kayaks, travel pods, etc. The Rack incorporates a number of design features to allow locking and unlocking, handle extension, rack base attachment to an existing original equipment manufacturer (OEM) crossbar, and switching attachments (specialized racks) on the carriage. The rack will be designed for various vehicles that can carry recreational, commercial, military, medical, and other loads on their roofs.

Figure 1:
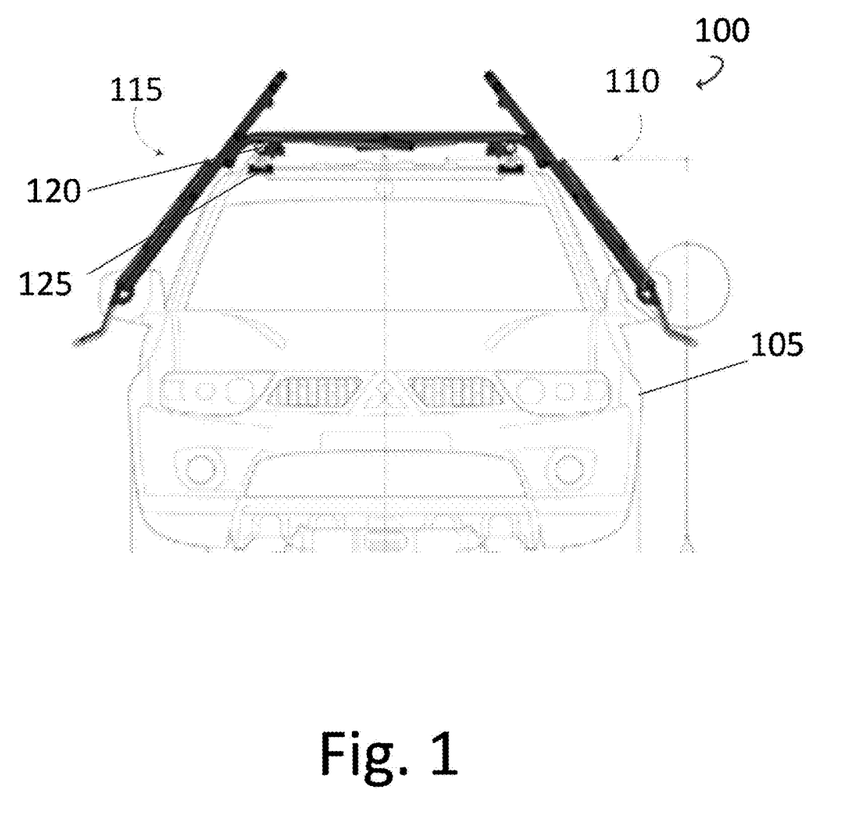
FIG. 1 illustrates a roof rack environment according to an embodiment of the invention.

FIG. 1 illustrates a roof rack environment 100 according to an embodiment of the invention. The environment 100 includes a vehicle 105 including a driver side 110 and a passenger side 115, side rails 120, and attachments 125.

The environment 100 is a rack compatible vehicle configured to receive a roof rack to carry rooftop objects (not shown). The objects, also referred to as goods, include bulky items like luggage, bicycles, canoes, kayaks, skis, surfboards, containers, boxes, and other goods. The environment 100 allows a vehicle user to transport objects on the roof of the vehicle without reducing trunk space or the interior passenger space. The environment 100 is also conducive for objects that do not easily fit inside the truck or interior space.

The vehicle 105, otherwise refers to as an automobile, car, or motor car, is illustrated as, and often is, an SUV. The vehicle is typically a tall vehicle, where the roof is at least eye level height, as realistically the apparatus would not be needed on a short vehicle unless the user is short, although in theory one with skill in the art could also use this roof rack on a sedan sized car. By contrast, with a conventional rack, even tall users currently have to climb on top of their SUV to reach the objects (e.g., skis, surfboard) on a conventional roof rack, which is dangerous for everyone, especially shorter users, but everyone has to do climb up to reach the conventional rack.

The vehicle 105 is rack compatible. One with skill in the art knows if a vehicle is rack compatible. For example, rack compatible vehicles would typically include SUVs, all sized cars, and jeeps. Less common rack compatible vehicles include pickup trucks, minivans, and convertibles. Rack compatible vehicles would typically not include large commercial trucks, tow trucks, semi-trucks, semi-trailers, buses, and trailers.

The driver side 110 and passenger side 115 are also known by one with skill in the art, and traverse the long sides of the car having doors, as opposed to the shorter ends of the car having an engine or a trunk.

The side rails 120 are factory installed rails attached to the vehicle 105. The side rails 120, or simply referred to as rails, are one of the main components of a roof rack. Two other main components of a roof rack are towers and mounts (not shown). Towers, also referred to as rack feet, clamp to the side rails and attach to the mounts. Mounts, can include a pair of cross bars including front and back steel or aluminum beams that traverse perpendicular to the vehicle's side rails. The mounts can include other specialized accessories that attached to a specific type of rooftop object. Although the roof rack is illustrated with a factory installed side rails 120 that run the length of the car, which most SUV and mid-sized cars use, one of ordinary skill in the art would realize that a roof rack could also be installed on a vehicle with other types of rooftop designs, such as a bare roof along with tracks/channels for receiving the roof rack.

The attachments 125 attach to the side rails 120 the vehicle 105. For the illustrated factory installed roof rack, the attachments 125 include four points of contact with the roof. In other embodiments, the attachments 125 include a pair of tracks running across the roof of the vehicle and configured to receive cross bars. Cross bars are typically aftermarket beams, perpendicular to the side rails.

Figure 2:
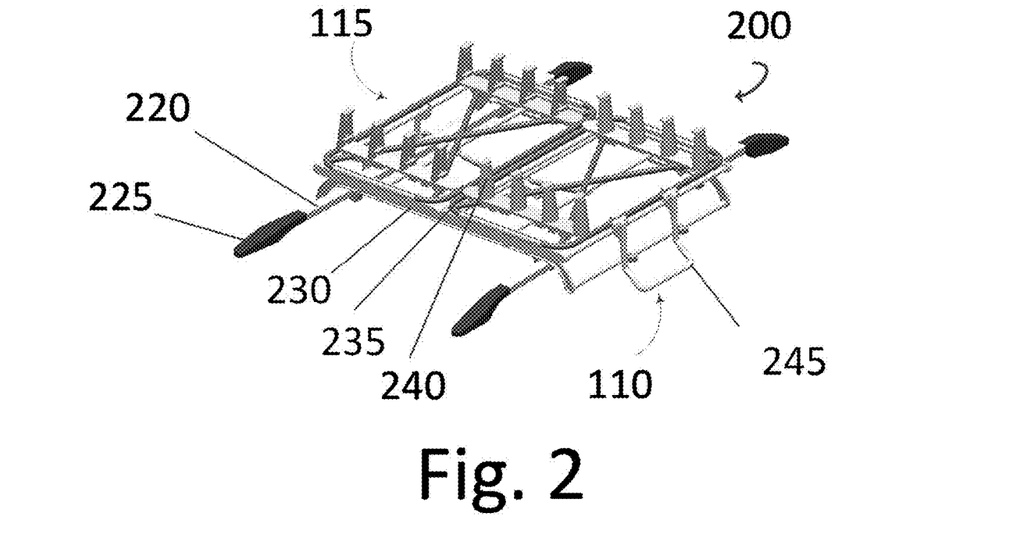
FIG. 2 illustrates a perspective view of a new apparatus according to an embodiment of the invention.

FIG. 2 illustrates a new apparatus 200 according to an embodiment of the invention. The apparatus 200 (e.g., a vehicle rack delivery system) illustrates the driver side 110 and the passenger side 115, a pair of side rails 220, four attachments 225, a base 230, a pair of carriers 235, a plurality of racks 240, and a pair of handles 245. The apparatus 200 traverses down both the driver and passenger sides 110, 115 of the vehicle 105. The apparatus 200 attaches to the vehicle's side rails 220 through the attachments 225, which may be the same as the side rails 120 and the attachments 125 illustrated and discussed with respect to the previous figure.

The base 230 attaches to the roof of the vehicle 105, provides structural integrity for the apparatus, and provides a structural connection to the carriers 235. The base 230 includes a flat portion and a curved portion, not fully flat, as the curved portion drops down near the edges of the roof in a horse-shoe like, u-shaped, or c-shaped end of the rack. The curved c-shaped portion allows the passenger side 115 of the apparatus 200 to initially tilt up, while the drivers slide 110 slides down at the near vertical angle. This curved portion avoids the need for another mechanical component to provide the swiveling angle.

The carriers 235 provide structural integrity for racks 240 or another rack design to attach to. Each of the two carriers 235 is illustrated as an oval with two cross bars going through them. The carriers 235 include two carriers that traverse along the base 230 in opposite directions down opposite sides of the vehicle 105. The curved portion keeps the carriers 235 from coming out very far away from the vehicle 105 as the carrier 235 slides down the base 230.

The racks 240 securely attach to and sit into the carriers 235 and hold the objects. The racks 240 can be connected to the carriers 235 and disconnected from the carriers 235 using a quick attach/detach mechanism referred to as a quick-connect attachment. Although FIG. 2 illustrates 16 total racks on the carriers 235, one of skilled in the art could include more or fewer racks to securely fasten an object to the roof of the vehicle. Also, the racks 240 (e.g., ski rack design) are designed for a particular object (e.g., skis), these removable racks can be disconnected from and connected to the carriers 235, being replaced with another rack (e.g., a pod, a bike rack, a board rack, a surfboard rack, etc.) designed for another rooftop item. The handles 245 removably attach to the carriers 235, one handle per carrier 235. In one embodiment, a user grabs the handle 245, which is lower to the ground than the carrier 235, to unlock the load and initiate the delivery of the carriers 235. The apparatus 200, and more specifically the base 230, carriers 235, racks 240, and handles 245 are discussed in more detail in FIGS. 5-8, respectively.

Figure 3:
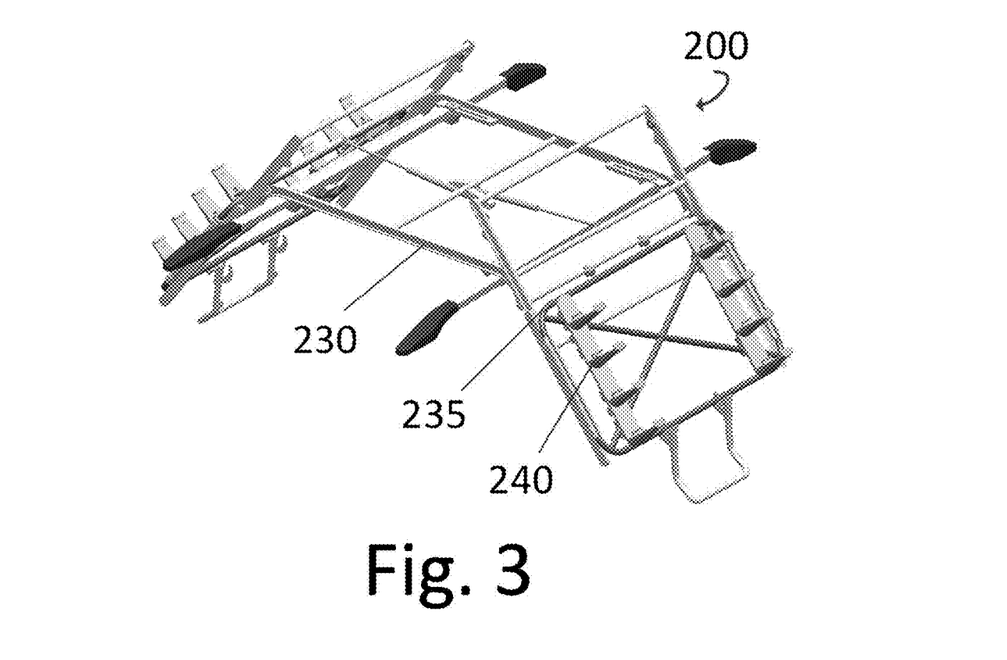
FIG. 3 illustrates a perspective view of the apparatus extending outward and downward according to an embodiment of the invention.

FIG. 3 illustrates a perspective view of the apparatus 200 extending outward and downward according to an embodiment of the invention. This view provides a clearer view of the base 230, one of the carriers 235, and eight of the racks 240. As illustrated, the base 230 is not flat, but curved downwards at the ends, and stays stationary, as the carriers 235 and the racks 240, glide outwards and through grooves of the base 230 and downwards over the edge of the roof and down the sides of the vehicle 105.

Figure 4:
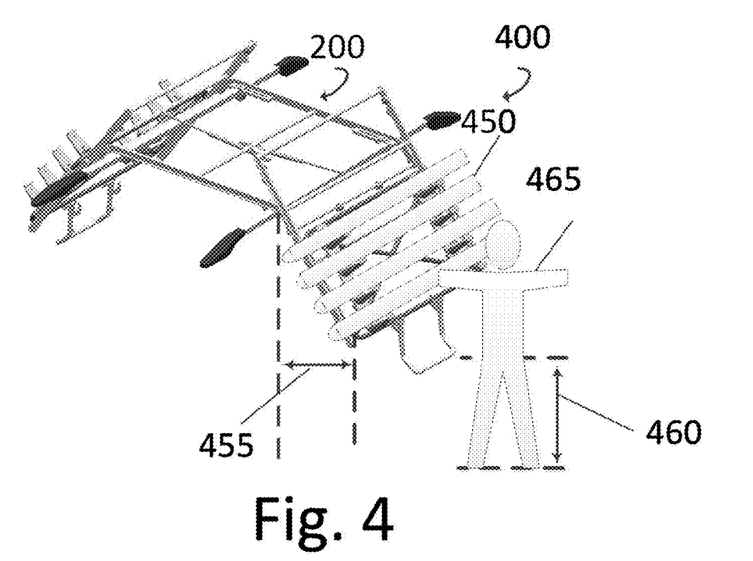
FIG. 4 illustrates a perspective view of a system delivering an object within a predetermined distance of the sides of a vehicle at a user working height according to an embodiment of the invention.

FIG. 4 illustrates a perspective view of a system 400 delivering one or more rooftop objects 450 within a predetermined distance 455 of the sides 110, 115 of the vehicle 105 at a user working height 460 according to an embodiment of the invention. The system 400 includes the apparatus 200, the vehicle 105 (not shown), the object 450, the predetermined distance 455, the user working height 460, and a user 465.

The carrier 235 of the apparatus 200 in the system 400 is positioned in the identical delivery position illustrated in the previous figure. The objects 450 are illustrated are skis, although in other embodiments the rack 240 is designed for another rooftop object. Other objects include bulky items such as luggage, bicycles, canoes, kayaks, surfboards, surfboards, containers, boxes, or other goods.

The predetermined distance 455 is provided by rounded edges of the base 230 (e.g., a C-shaped edge). The distance 455 is very close to the side edge of the vehicle 105, as shown in this figure, FIG. 1, and FIG. 9, such as within a foot or so of the vehicle, or fitting within a parking spot after extending beyond the sides of the vehicle, such that the user 465 can park the vehicle 105 in a parking lot with other cars on either side, and the user 465 can unload objects without making contact with other vehicles or other obstacles. Similarly, the vehicle 105 can be parked along a roadway, and the predetermined distance 455 allows the user to safely unload the object away from the roadway. Additional safety is provided with the dual carriers, as an object loaded can be loaded on a carrier on the passenger side 115 such that the object would be unloaded away from traffic when the vehicle 105 is parked parallel with traffic. The user working height 460 is a height that the user can easily load and unlock heavy rooftop objects onto the apparatus 200, such as waist height or chest level.

Figure 5:
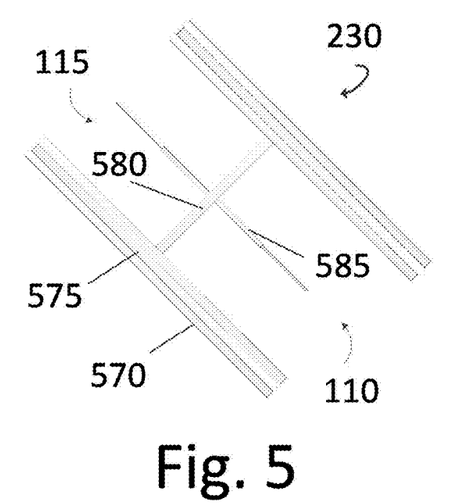
FIG. 5 illustrates an up close top view of a base of the apparatus according to an embodiment of the invention.

FIG. 5 illustrates an up close top view of the base 230 of the apparatus 200. The base 230 provides a structural attachment between the two side rails 120 and the two carriers 235 according to an embodiment of the invention. The base 230 in this figure is shown without the carriers 235, racks 240, or handles 245, such that it can be seen how the two carriers 235 would glide along the grooves 575 towards the driver and passenger sides 110, 115 of the vehicle 105, although the curved base edges down the sides of the vehicle are not shown in this top view. The base 230 includes a pair of cross beams 570 including grooves 575, a holding beam 580, and a pair of extender beams 585.

The two cross beams 570 attach to four points of the two side rails 220, providing structural integrity. The cross beams provide the grooves 575 for the carriers 235 to traverse along. A groove 575 is a female fitting that exists on each of the two cross beams 570, and the grooves extend from the from the driver side 110 to the passenger side 115, the carriers 235 attaching to and sliding along the grooves 575. The holding beam 580 connects the two cross beams 570 and provides structural integrity for the cross beams 570 and the extender beams 585.

The extender beams 585 attach to the holding beam 580 and provide controlled delivery of one or more objects from the roof of the vehicle 105 to the user working height 460. The extender beams 585 push the carriers 235 through the grooves 575 across the roof and down the sides of the vehicle 105. In one embodiment, the extender beams 585 are a mechanic or hydraulic device (e.g., pneumatic controls), such as a shock absorber or a strut, providing friction to control the fall of the load/object to ensure smooth delivery as one of the carriers 235 comes down slowly towards the user 465. Pneumatic controls are like the type of components on the back of an SUV that keeps the hatch open. In another embodiment, the extender beams 585 are an electric device such as electronically controlled arm that extends and contracts, also to ensure smooth delivery as the carrier comes down slowly towards the user 465.

In other embodiments, as opposed to a base groove controlling the movement of carriers, other carrier embodiments provide additional ways to deliver an object to the side of a vehicle. In one embodiment, the carrier includes a straight inner tube within a straight outer tube, the straight inner tube attached to a ball joint, or grooved pulley, configured to pull the base all the way out, swivel it down and drop it, the straight inner tube being pulled out across a base and across the roof and to travel down the side of the vehicle. In another embodiment, the carrier includes a curved inner tube within a curved outer tube, the curved inner tube configured to travel down the side of the vehicle. In a further embodiment, the base includes a pair of hinged arms that lift and swivel the carriers out and over the side of the vehicle.

Figure 6:
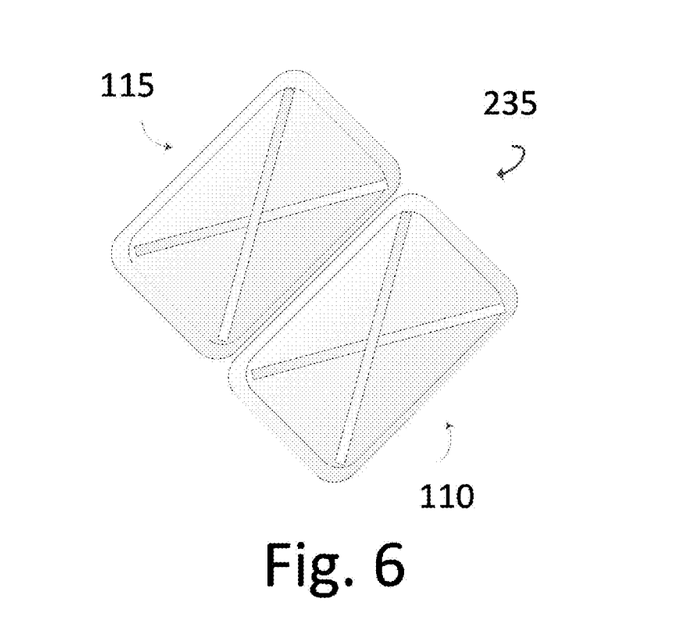
FIG. 6 illustrates an up close top view of a pair of carriers of the apparatus according to an embodiment of the invention.

FIG. 6 illustrates an up close top view of the pair of carriers 235 of the apparatus 200 according to an embodiment of the invention. The carriers 235 attach to the grooves 575 of the base 230 and have two diagonal beams for the racks 240 to connect to. The carriers 235, in combination with the racks 240 hold the objects onto the apparatus 200. The apparatus does not need another attachment such as a rope, a tie down or a strap, etc., although one with skill in the art could add this type of attachment.

Figure 7:
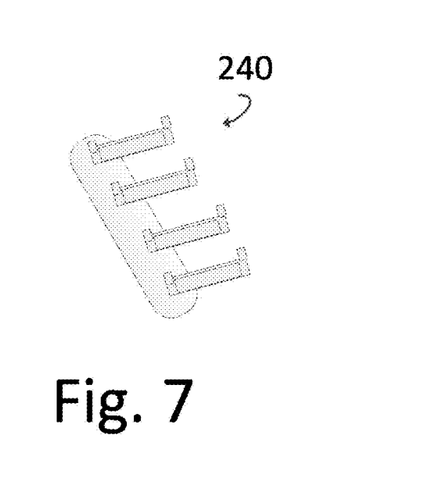
FIG. 7 illustrates an up close side view of a plurality of racks of the apparatus according to an embodiment of the invention.

FIG. 7 illustrates an up close side view of the plurality of racks 240 of the apparatus 200 according to an embodiment of the invention. The illustrated racks 240 (e.g., ski racks, pop on racks, etc.) are a set of four racks on a plate that attaches to the two diagonal beams of one of the carriers 235. The plate of four racks can be connected to the carriers 235 and disconnected from the carriers 235 using a quick attach/detach mechanism referred to as a quick-connect attachment. The attachment to the carriers 235 can be a set of spring that needs to be compressed in order to provide an opening for the back of the plate holding the four racks to provide enough space to clamp to the two diagonal beams when the spring compression is released. Although the racks 240 are illustrated as being for a ski rack design, any other quick connect rack design can be used for another rooftop item (e.g., a pod, a bike rack, a board rack, a surfboard rack, etc.).

The set of four racks 240 punches down, or quick connects into one of the carriers 235, and can be removed and switched out with another kind of rack. In other embodiments the racks are designed for another rooftop object, where the racks 240 can be taken off and replaced by another rack (e.g., a pod that opens and swings down and the user can throw load objects inside the pod) designed for the other rooftop object. The racks 240, in combination with the carriers 235 hold the objects onto the apparatus 200. The racks 240 provide structural integrity for the object 450 after the carrier 235 has slide down the side of the vehicle 105 and after the strap has been removed.

Figure 8:
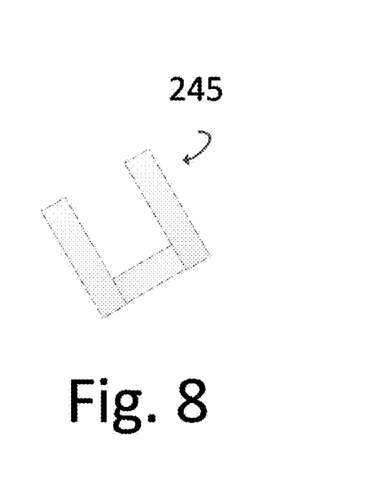
FIG. 8 illustrates an up close side view of a handle of the apparatus according to an embodiment of the invention.

FIG. 8 illustrates an up close side view of a handle 245 of the apparatus 200 according to an embodiment of the invention. The handle 245 unlocks the load such that the objects 450 are not sliding around. With other racks, such as a surfboard rack, other locks are needed to keep the surfboard securely attached to the car during travel. Also, the handle assists the user 465 to pull the one or more carriers 235 down the side of the vehicle 105 or to return the carriers 235 up to the roof of the vehicle. The user 465 reaches up and grabs the handle 245 to initiate delivery. The handles 245 are optional features that are removably attached to the carriers 235, such that they can be attached or detached depending on whether they are needed or useful. The handles 245 can be useful in a mechanical embodiment, such as a strut controlling the delivering of one of the carriers 235, especially if the user 465 is not tall enough to reach the vehicle's roof, such as a user that is five feet tall, to prevent a user from climbing on top of their vehicle to reach the carriers 235.

If another form of locking is used, the handles 245 are not needed and can be removed in an electrical embodiment, such as electrical arm controlling the delivering of one of the carriers 235, if the height of the vehicle 105 is also low, or if the user 465 is tall enough to reach the carriers 235 at the height of the vehicle's roof. Additionally, if height is not an issue, such as for a taller user or a sedan sized car, the handles can be removed as the user can grab one of the carriers 235 to unlock and initiate the delivery of the object 450. The handle supports the advantage of preventing the user 465 from having to climb on top of the car. Removing the handle 245 improves on another advantage, the apparatus 200 staying close to the vehicle 105, preventing the object 450 from hitting from other parked cars and keeping the user 465 out of the roadway.

Figure 9:
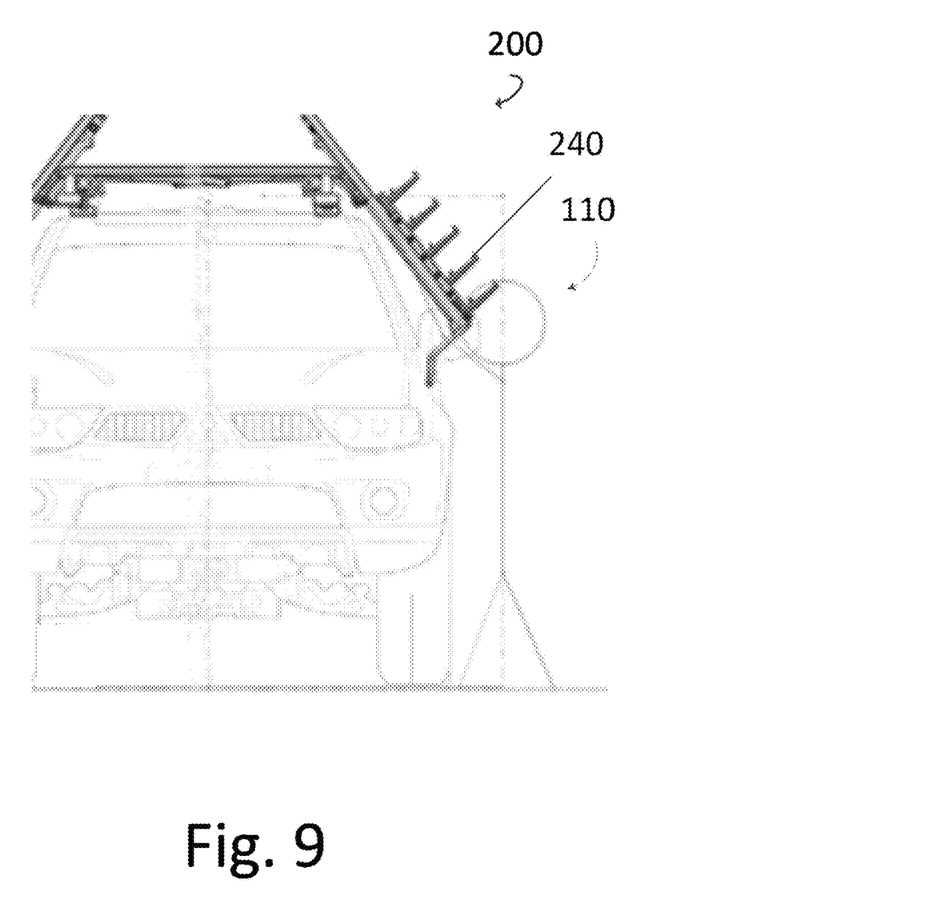
FIGS. 9-11 illustrate alternative views of the apparatus according to embodiments of the invention.
Figure 10:
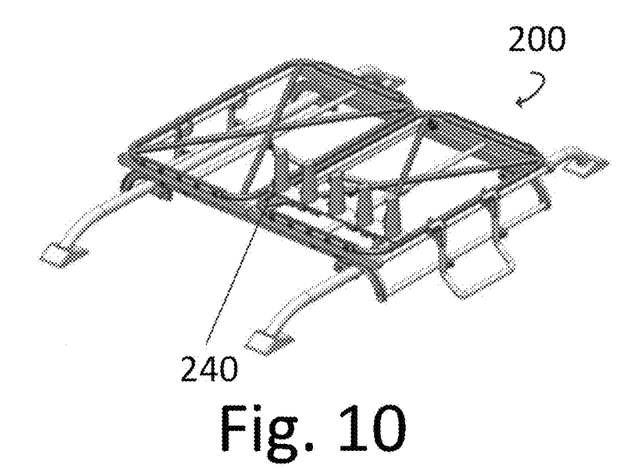
Figure 11:
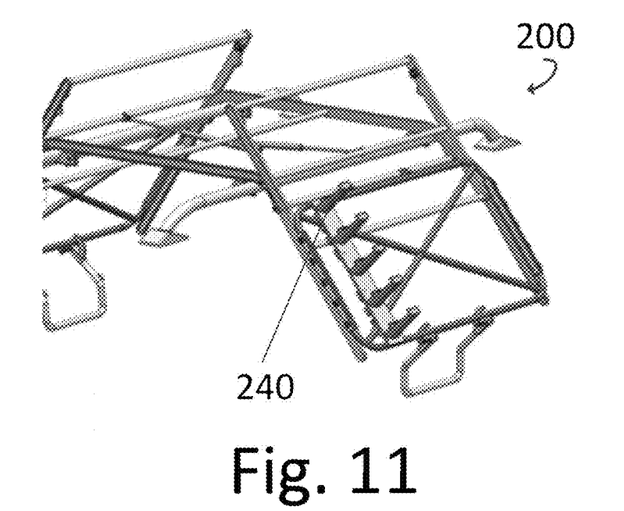

FIGS. 9-11 illustrate alternative views of the apparatus 200 according to embodiments of the invention. In FIG. 9, the driver side 110 of the apparatus 200 is shown with racks 240 and illustrates how the carrier 235 slides straight down and not away from the vehicle 105. FIG. 9 also illustrates how low the carrier 235 goes down, in one embodiment, even though the carrier extends above the vehicle, the base 230 caps off how far the carrier 235 can go down. In FIG. 10, the apparatus 200 is shown with fewer racks 240 attached, with most racks removed such that the remaining components can be seen. FIG. 11 is again the apparatus 200 with fewer racks 240 attached, with the apparatus 200 extending outward and downward.

Figure 12:
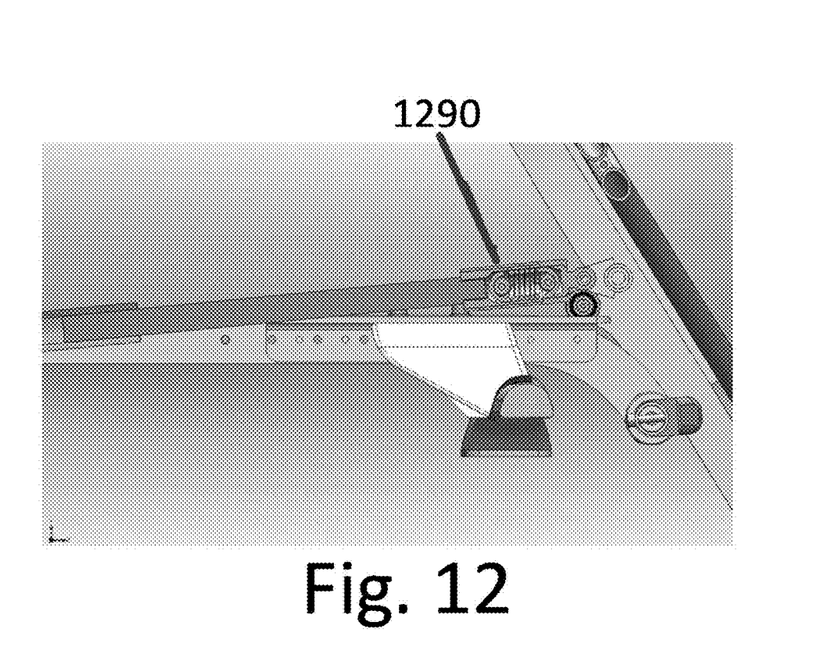
FIGS. 12-15 illustrate a spring mechanism that allows the apparatus to relieve strain caused by improper use of the apparatus.
Figure 13:
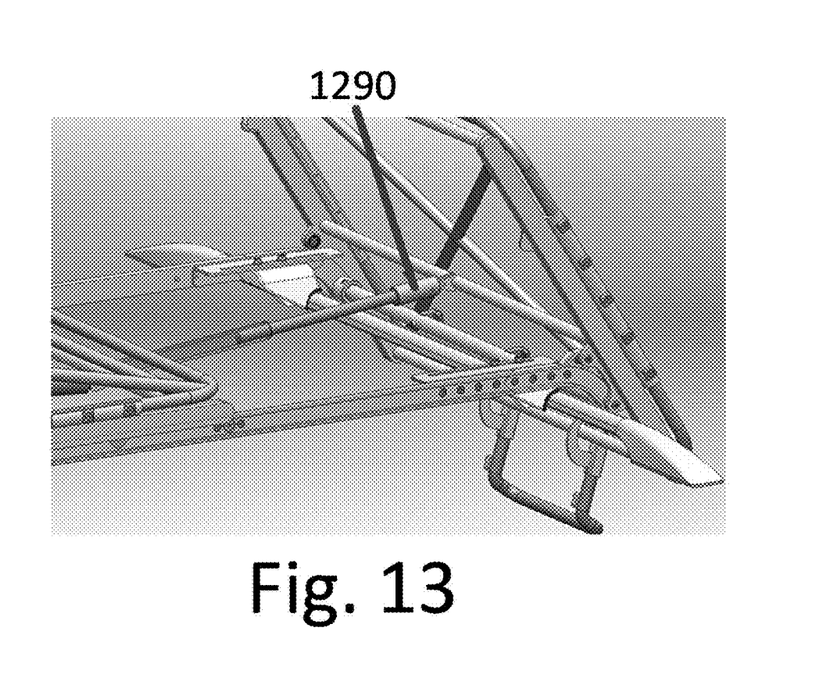
Figure 14:
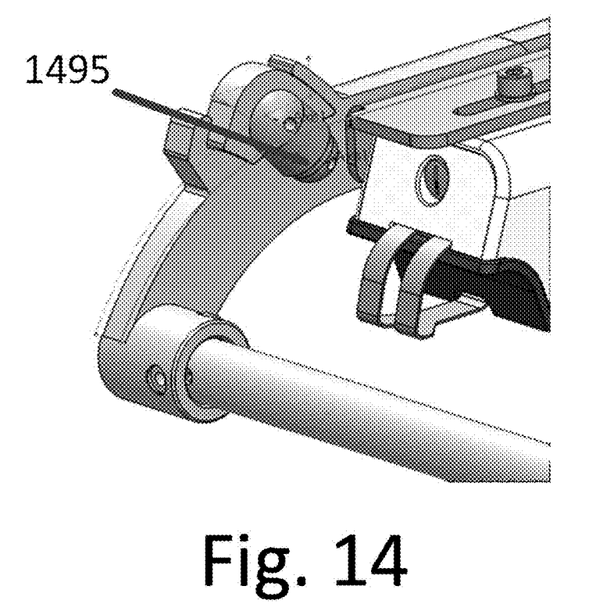
Figure 15:
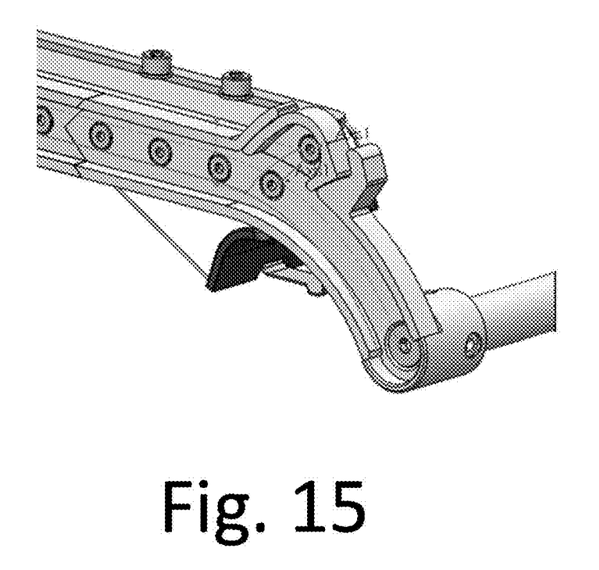

FIGS. 12-15 illustrate a spring mechanism that allows the apparatus to relieve strain caused by improper use of the apparatus. FIGS. 12-13 illustrate side and perspective views of an extender beam spring 1290 on the extender beam 585 of the apparatus 200. The spring 1290 is a spring mechanism that allows the loaded rack apparatus to "give" when improperly pushed laterally by a user. This spring 1290 allows the rack to drift "inward" towards the vehicle to relieve the strain of improper use. FIGS. 14-15 illustrate inside and outside views of the base 230, where the inside view illustrates a base spring 1495 on the base 230 of the apparatus 200. The base spring 1495 is another spring element that allows the apparatus 200 to drift inward when improperly pushed by the user.

FIGS. 16-19 illustrate perspective views of an apparatus 1600 according to an embodiment of the invention with racks designed for another object (i.e., a pod). FIGS. 16-19 illustrate a back passenger side view, a back driver side view, a front passenger side view, and a front driver side view, respectfully, of the apparatus 1600.

Figure 16:
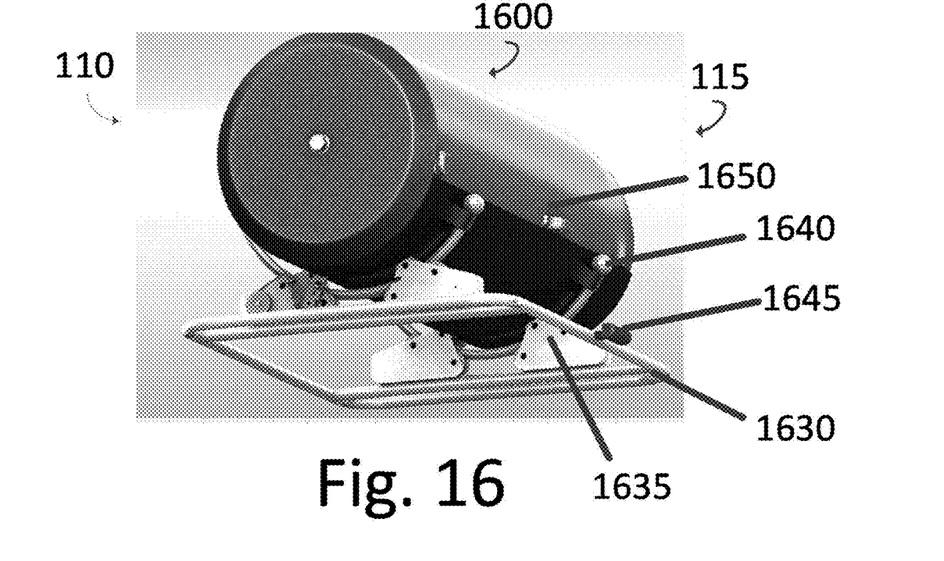
FIGS. 16-19 illustrate perspective views of an apparatus according to an embodiment of the invention with racks designed for another object.
Figure 17:
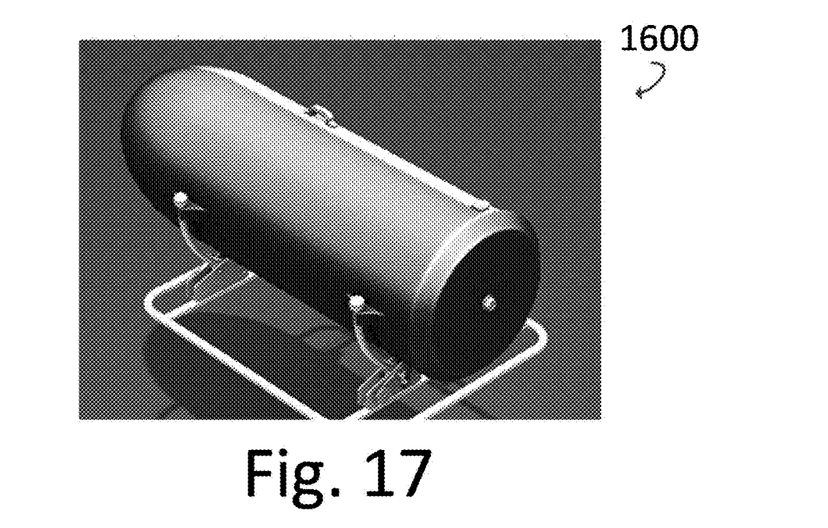
Figure 18:
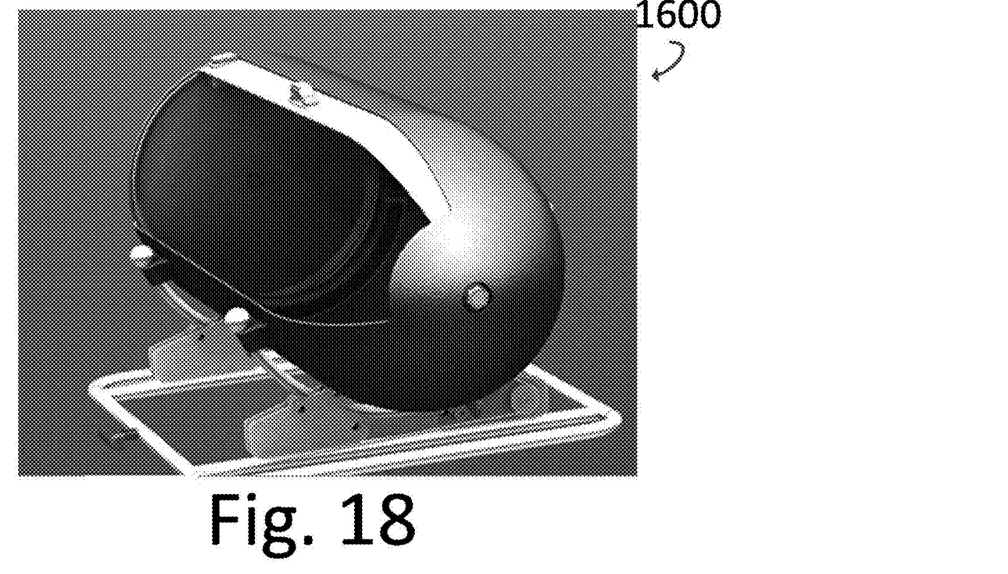
Figure 19:
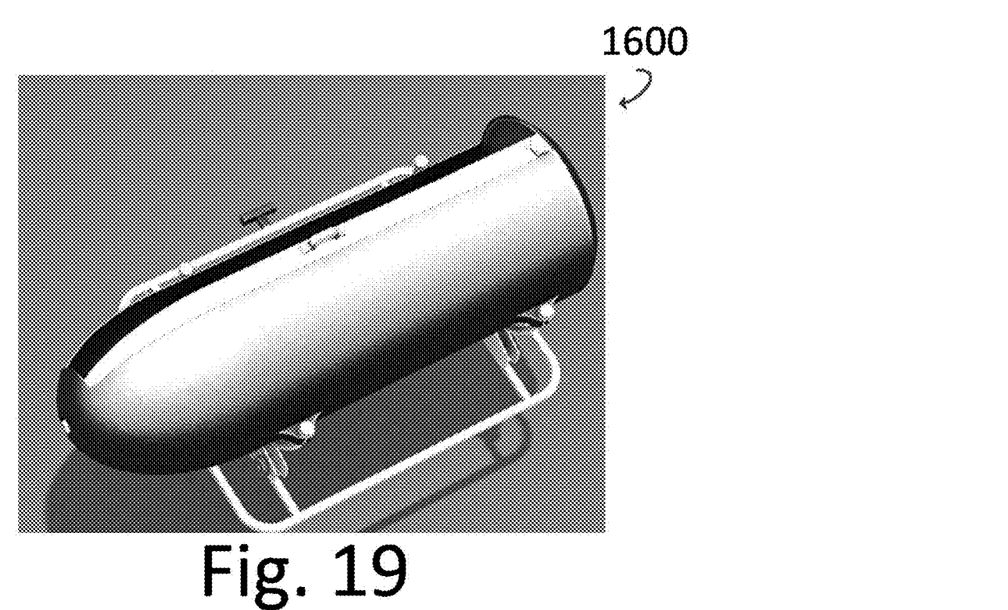

FIG. 16 illustrates the apparatus 1600 having a base 1630 holding four carriers 1635 that traverses between the driver side 110 and passenger side 115 and the base 1630 also has a handle 1645 on the passenger side 115. The carriers 1635 attach to a pair of racks 1640 that hold an object 1650. One with skill in the art could include greater or fewer carriers 1635, racks 1640, handles 1645, or objects 1650. FIGS. 17-19 illustrates other views of the apparatus 1600.

Figure 20:
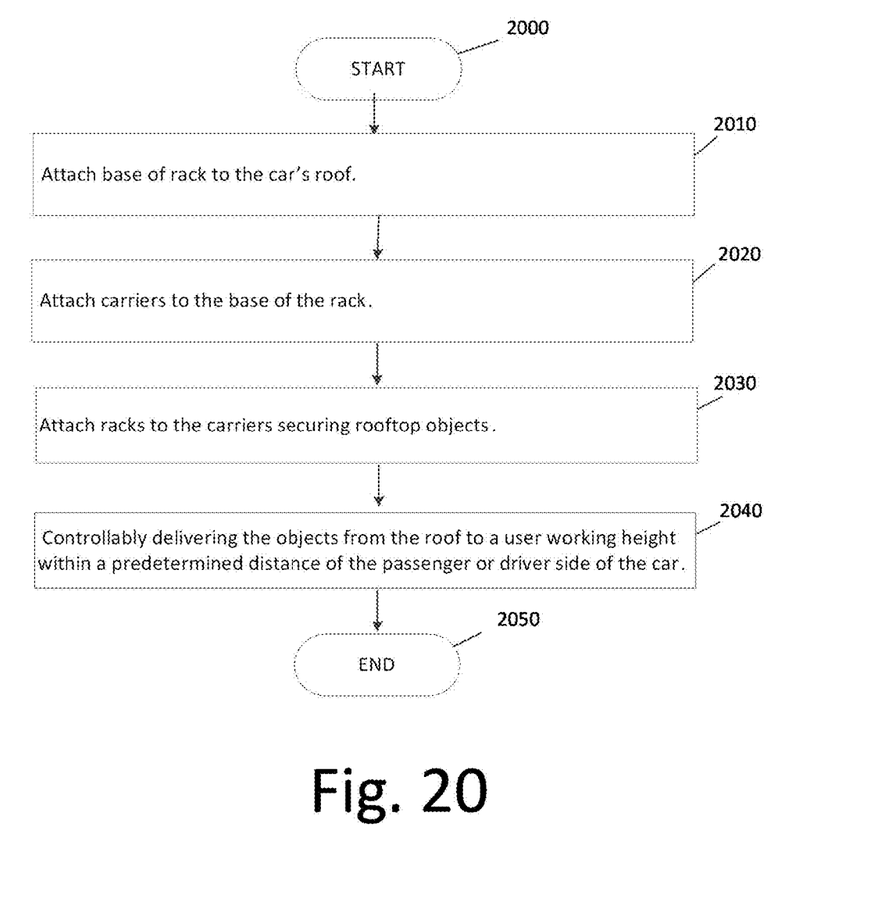
FIG. 20 illustrates a vehicle rack delivery process according to an embodiment of the invention.

FIG. 20 illustrates a vehicle rack delivery process according to an embodiment of the invention. The process starts at step 2000. At step 2010, a manufacturer attaches the base 230 of the apparatus 200 (e.g., the Rack) to the roof of the car's roof. At step 2020, the manufacturer attaches the carriers 235 to the base 230 of the rack 200. At step 2030, the user 465 attaches racks 240 to the carriers 235 securing rooftop objects 450. At step 2040, the base 230 of the apparatus 200 then controllably delivers the one or more objects 450 from the roof to the user working height 455 within the predetermined distance 455 of the passenger or driver sides 110, 115 of the car 105. The process ends at step 2050.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. An apparatus comprising:
    a base attached to a roof of a vehicle;
    one or more sliding carriages attached to the base;
    one or more carriers attached to the sliding carriages;
    one or more racks removably attached to the carriers, the racks securing one or more rooftop objects on the roof during operation of the vehicle; and
    one or more extender beams attached to the sliding carriages and the base, wherein the extender beams attach to an inner portion of the sliding carriages, the inner portion located closer to a centerline of the vehicle than to a driver side or a passenger side;
    wherein the extender beams are retained at a substantially fixed angle, wherein the extender beams controllably move the carriers and the objects mechanically, electrically, or hydraulically along the base,
    wherein the base controllably delivers the carriers and the objects from the roof to at least one of the passenger side or the driver side of the vehicle, and the base comprises a flat portion and a curved portion, the curved portion delivers the carriers and the objects within a predetermined distance of the driver side or the passenger side of the vehicle.

2. The apparatus of claim 1, wherein the curved portion of the base comprises a C-shape.

3. The apparatus of claim 1, wherein the base controllably delivers the carriers and the objects from the roof to a user working height.

4. The apparatus of claim 1, wherein the carriers include a carrier on the passenger side of the roof, the carrier on the passenger side travels across the base over and down the passenger side of the vehicle.

5. The apparatus of claim 1, wherein the carriers comprise at least two carriers that travel in opposite directions across the base, one of the at least two carriers travels towards the passenger side and another of the at least two carriers travels toward the driver side.

6. The apparatus of claim 3, wherein the base comprises one or more grooves extending from the driver side to the passenger side, the carriers attaching to and sliding along the grooves from the roof to the user working height.

7. The apparatus of claim 1, wherein the predetermined distance comprises within one foot of the vehicle.

8. The apparatus of claim 1, wherein the carriers further comprises one or more handles attached to the carriers, wherein a user grabbing a handle of the handles unlocks and initiates delivery of one of the carriers.

9. The apparatus of claim 1, wherein the carriers comprises a straight inner tube within a straight outer tube, the straight inner tube configured to swivel out, over, and to travel down the driver side or the passenger side of the vehicle.

10. The apparatus of claim 1, wherein the carriers comprises a curved inner tube within a curved outer tube, the curved inner tube configured to travel down the driver side or the passenger side of the vehicle.

11. The apparatus of claim 1, wherein the carriers comprises a pair of hinged arms that lift and swivel the carriers out and over the driver side or the passenger side of the vehicle.

12. A method comprising:
    attaching a base to a roof of a vehicle;
    one or more sliding carriages attached to the base;
    attaching one or more carriers to the sliding carriages;
    removably attaching one or more racks to the carriers, the racks securing one or more rooftop objects on the roof during operation of the vehicle; and
    attaching one or more extender beams on the base, wherein the extender beams controllably move the carriers and the objects mechanically, electrically, or hydraulically along the base, wherein the base controllably delivers the carriers and the objects from the roof to at least one of a passenger side or a driver side of the vehicle, and the base comprises a flat portion and a curved portion, the curved portion delivers the carriers and the objects within a predetermined distance of the driver side or the passenger side of the vehicle.

13. The method of claim 12, wherein the curved portion of the base comprises a C-shape.

14. The method of claim 12, wherein the base controllably delivers the carriers and the objects from the roof to a user working height.

15. The method of claim 12, wherein the carriers include a carrier on the passenger side of the roof, the carrier on the passenger side travels across the base over and down the passenger side of the vehicle.

16. The method of claim 12, wherein the carriers comprise at least two carriers that travel in opposite directions across the base, one of the at least two carriers travels towards the passenger side and another of the at least two carriers travels toward the driver side.

17. The method of claim 14, wherein the base comprises one or more grooves extending from the driver side to the passenger side, the carriers attaching to and sliding along the grooves from the roof to the user working height.

18. A system comprising:
   a vehicle;
   a base attached to a roof of the vehicle;
   a rooftop object;
   a sliding carriage attached to the base;
   a carrier attached to the sliding carriage;
   a rack attached to the carrier, the rack securing the object on the roof during operation of the vehicle; and
   an extender beam on the base, wherein the extender beam controllably moves the carrier and the object mechanically, electrically, or hydraulically along the base, wherein the base controllably delivers the carrier and the object from the roof to at least one of a passenger side or a driver side of the vehicle, and the base comprises a flat portion and a curved portion, the curved portion delivers the carrier and the objects within a predetermined distance of the driver side or the passenger side of the vehicle.

19. The system of claim 18, wherein the curved portion of the base comprises a C-shape.

* * * * *